(12) United States Patent
English et al.

(10) Patent No.: US 7,073,115 B2
(45) Date of Patent: Jul. 4, 2006

(54) CORRECTING MULTIPLE BLOCK DATA LOSS IN A STORAGE ARRAY USING A COMBINATION OF A SINGLE DIAGONAL PARITY GROUP AND MULTIPLE ROW PARITY GROUPS

(75) Inventors: Robert M. English, Menlo Park, CA (US); Peter F. Corbett, Lexington, MA (US); Steven R. Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 487 days.

(21) Appl. No.: 10/035,603

(22) Filed: Dec. 28, 2001

(65) Prior Publication Data

US 2003/0126522 A1   Jul. 3, 2003

(51) Int. Cl.
*G11C 29/00* (2006.01)
*G06F 11/00* (2006.01)

(52) U.S. Cl. .......................... 714/770; 714/6; 711/114

(58) Field of Classification Search ................ 714/763, 714/764, 770, 755, 756, 800, 804, 805, 6, 714/801, 802, 803, 758; 711/114
See application file for complete search history.

(56) References Cited

U.S. PATENT DOCUMENTS

| 3,876,978 | A | 4/1975 | Bossen et al. |
| 4,092,732 | A | 5/1978 | Ouchi |
| 4,201,976 | A | 5/1980 | Patel |
| 4,205,324 | A | 5/1980 | Patel |
| 4,375,100 | A | 2/1983 | Tsuji et al. |
| 4,467,421 | A | 8/1984 | White |
| 4,517,663 | A | 5/1985 | Imazeki et al. |
| 4,667,326 | A | 5/1987 | Young et al. |
| 4,688,221 | A | 8/1987 | Nakamura et al. |
| 4,722,085 | A | 1/1988 | Flora et al. |
| 4,755,978 | A | 7/1988 | Takizawa et al. |
| 4,761,785 | A | 8/1988 | Clark et al. |
| 4,775,978 | A | 10/1988 | Hartness |
| 4,796,260 | A | 1/1989 | Schilling et al. |
| 4,817,035 | A | 3/1989 | Timsit |
| 4,825,403 | A | 4/1989 | Gershenson et al. |
| 4,837,680 | A | 6/1989 | Crockett et al. |
| 4,847,842 | A | 7/1989 | Schilling |
| 4,849,929 | A | 7/1989 | Timsit |

(Continued)

OTHER PUBLICATIONS

U.S. Appl. No. 10/035,607, filed Dec. 28, 2001, Corbett et al.

(Continued)

*Primary Examiner*—Guy Lamarre
*Assistant Examiner*—James C. Kerveros
(74) *Attorney, Agent, or Firm*—Cesari and McKenna, LLP

(57) ABSTRACT

A technique efficiently corrects multiple storage device failures in a storage array using a combination of a single diagonal parity group and multiple row parity groups. The storage array includes a plurality of concatenated sub-arrays, wherein each sub-array includes a set of data storage devices and a parity storage device. Each row parity group is associated with a sub-array of the array. The array further includes a global parity storage device holding diagonal parity computed across the concatenation of the sub-arrays. Instead of requiring that each parity group contain both a row parity device and a diagonal parity device, the array is composed of a collection of row parity groups. Diagonal parity is calculated across the full array.

67 Claims, 6 Drawing Sheets

U.S. PATENT DOCUMENTS

| | | | |
|---|---|---|---|
| 4,849,974 | A | 7/1989 | Schilling et al. |
| 4,849,976 | A | 7/1989 | Schillling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A * | 11/1996 | Blaum et al. ................... 714/7 |
| 5,623,595 | A | 4/1997 | Bailey |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebalski |
| 6,158,017 | A | 12/2000 | Han et al. |
| 6,223,300 | B1 | 4/2001 | Gotoh |
| 6,247,157 | B1 | 6/2001 | Edirisooriya |
| 6,289,356 | B1 | 9/2001 | Hitz et al. |
| 6,532,548 | B1 | 3/2003 | Hughes |
| 6,581,185 | B1 | 6/2003 | Hughes |
| 6,654,926 | B1 * | 11/2003 | Raphaeli et al. ............ 714/780 |

OTHER PUBLICATIONS

David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Anvin, Peter H, "*The Mathematics of RAID 6*," Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks*, Technical Memorandum 45312-891206-01TM, AT&T, Bell Laboratories, Department 45312, Holmdel, NJ, Dec. 1989.
Bitton, Dina, *Disk Shadowing*, Proceedings of the 14th VLDB Conference, LA, CA (1988).
Bultman, David L., *High Performance SCSI Using Parallel Drive Technology*, In Proc. Buscon Conf., pp. 40-44, Anaheim, CA, Feb. 1988.
Chen, Peter et al., *Two Papers on RAIDs*. Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890*, Performance Evaluation, pp. 74-85, 1990—check to see if exact same copy as one in WAFL.
Chen, Peter M.., et al, Maximizing Performance in a Striped Disk Array, Proc. 1990 *ACM SIGARCH 17th Intern. Symp. on Comp. Arch.*, Seattle, WA, May 1990, pp. 322-331.
Chen, Peter M., et al., *RAID:High Performance, Reliable Secondary Storage*, ACM Computing Surveys, 26(2):145-185, Jun. 1994.
Chervenak, Ann L., *Performance Measurement of the First RAID Prototype*, Technical Report UCB/CSD 90/574, Computer Science Division (EECS), University of California, Berkeley, May 1990.
Copeland, George, et al., "*A Comparison of High-Availability Meida Recovery techniques*," in Proc. ACM-SIGMOD Int. Conf. Management of Data, 1989.
Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.
Evans *The Tip of the Iceberg:RAMAC Virtual Array—Part I*, Technical Support, Mar. 1997, pp. 1-4.
Gibson, Garth A., et al., *Coding Techniques for Handling Failures in Large Disk Arrays*, Technical Report UCB/CSD 88/477, Computer Science Division, University of California, (Jul. 1988.).
Gibson, Garth A., et al., *Failure Correction Techniques for Large Disk Arrays*, In Proceedings Architectural Support for Programming Languages and Operating Systems, Boston, Apr. 1989, pp. 123-132.
Gibson, Garth A., et al., *Strategic Directions in Storage I/O Issues in Large-Scale Computing*, ACM Computing Survey, 28(4):779-93, Dec. 1996.
Goldick, Jonathan S., et al., *Multi-resident AFS: An Adventure in Mass Storage*, In Proceedings of the 1995 USENIX Technical Conference, pp. 47-58, Jan. 1995.
Graham, Susan L., et al., *Massive Information Storage, Management, and Use*, (NSF Institutional Infrastructure Proposal), Technical Report No. UCB/CSD 89/493, Jan. 1989.
Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.
Grimes, DW Martinez, *Two Dimensional Parity Error Correction Procedure*, IBM Technical Disclosure Bulletin 2686-2689, Oct. 1982.
Grimes, DW Martinez, *Vertical Parity Generator for Two Dimensional Parity*, IBM Technical Disclosure Bulletin 2682-2685, Oct. 1982.
Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, IEEE Transactions on Software Engineering, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Author's Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27—Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKROM—"About RAID 6", Aug. 17, 2004.

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

Mario Blaum, Jim Brady, Jehoshua Bruck and Jai Menon. Evenodd: An Efficient Scheme for Tolerating Double Disk Failures in RAID Architectures. IEEE Transactions on Computers, vol. 44, No. 2, Feb. 1995.

\* cited by examiner

| DATA DISK 0 | DATA DISK 1 | DATA DISK 2 | DATA DISK 3 | DATA DISK 4 | ROW PARITY DISK | DIAGONAL PARITY DISK |
|---|---|---|---|---|---|---|
| D04 | D05 | D06 | D07 | D0X | P0 | P4X |
| D15 | D16 | D17 | D1X | D14 | P1 | P5X |
| D26 | D27 | D2X | D24 | D25 | P2 | P6X |
| D37 | D3X | D34 | D35 | D36 | P3 | P7X |

FIG. 1
(PRIOR ART)

CORRECTING MULTIPLE BLOCK DATA LOSS IN A STORAGE ARRAY USING A COMBINATION OF A SINGLE DIAGONAL PARITY GROUP AND MULTIPLE ROW PARITY GROUPS

The present invention is related to the following copending and commonly assigned U.S. patent application Ser. No. 10/035,607 filed on Dec. 28, 2001 now Issued U.S. Pat. No. 6,993,701 on Jan. 31, 2006 titled, Row-Diagonal Parity Technique for Enabling Efficient Recovery from Double Failures in a Storage Array, which was filed on even date herewith and which application is hereby incorporated by reference as though fully set forth herein.

FIELD OF THE INVENTION

The present invention relates to arrays of storage systems and, more specifically, to a technique for efficiently reconstructing any one or combination of two failing storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by the same process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

It is common to store the direct XOR sum of data bits as the parity bit value. This is often referred to as "even parity". An alternative is to store the complement of the XOR sum of the data bits as the parity bit value; this is called "odd parity". The use of even or odd parity with respect to the invention disclosed herein is not specified. However, the algorithms referenced herein are described as if even parity is used, where such a distinction is relevant. Yet it will be apparent to those skilled in the art that odd parity may also be used in accordance with the teachings of the invention.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remains "online" and continues to serve requests (from clients or users) to access (i.e., read and/or write) data. If the storage system is busy serving requests, the elapsed time for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or section of a disk cannot be read. The unreadable data can be reconstructed if parity is maintained in the storage array. However, if one disk has already failed, then a media read error on another disk in the array will result in lost data. This is a second form of double failure. A third form of double failure, two media read errors in the same stripe, is unlikely but possible.

Accordingly, it is desirable to provide a technique that withstands double failures. This would allow construction of larger disk systems with larger parity groups, while ensuring that even if reconstruction after a single disk failure takes a long time (e.g., a number of hours), the system can survive a second failure. Such a technique would further allow relaxation of certain design constraints on the storage system. For example, the storage system could use lower cost disks and still maintain a high MTTDL. Lower cost disks typically have a shorter lifetime, and possibly a higher failure rate during their lifetime, than higher cost disks. Therefore, use of such disks is more acceptable if the system can withstand double disk failures within a parity group.

A known double failure correcting parity scheme is an EVENODD XOR-based technique that allows a serial reconstruction of lost (failed) disks. EVENODD parity requires exactly two disks worth of redundant data, which is optimal. According to this parity technique, all disk blocks belong to two parity sets, one a typical RAID-4 style XOR computed across all the data disks and the other computed along a set of diagonally adjacent disk blocks. The diagonal parity sets contain blocks from all but one of the data disks. For n data disks, there are n–1 rows of blocks in a stripe. Each block is on one diagonal and there are n diagonals, each n–1 blocks in length. Notably, the EVENODD scheme only works if n is a prime number. The EVENODD technique is disclosed in an article of IEEE Transactions on Computers, Vol. 44, No. 2, titled *EVENODD: An Efficient Scheme for Tolerating Double Disk Failures in RAID Architectures,* by Blaum et al, February., 1995. A variant of EVENODD is disclosed in U.S. Pat. No. 5,579,475, titled Method and Means for Encoding and Rebuilding the Data Contents of up to Two Unavailable DASDs in a DASD Array using Simple Non-Recursive Diagonal and Row Parity, by Blaum et al., issued on Nov. 26, 1996. The above-mentioned article and patent are hereby incorporated by reference as though fully set forth herein.

The EVENODD technique utilizes a total of p+2 disks, where p is a prime number and p disks contain data, with the remaining two disks containing parity information. One of the parity disks contains row parity blocks. Row parity is calculated as the XOR of all the data blocks that are at the same position in each of the data disks. The other parity disk contains diagonal parity blocks. Diagonal parity is constructed from p–1 data blocks that are arranged in a diagonal pattern on the data disks. The blocks are grouped into stripes of p–1 rows. This does not affect the assignment of data blocks to row parity sets. However, diagonals are constructed in a pattern such that all of their blocks are in the same stripe of blocks. This means that most diagonals "wrap around" within the stripe, as they go from disk to disk.

Specifically, in an array of n×(n–1) data blocks, there are exactly n diagonals each of length n–1, if the diagonals "wrap around" at the edges of the array. The key to reconstruction of the EVENODD parity arrangement is that each diagonal parity set contains no information from one of the data disks. However, there is one more diagonal than there are blocks to store the parity blocks for the diagonals. That is, the EVENODD parity arrangement results in a diagonal parity set that does not have an independent parity block. To accommodate this extra "missing" parity block, the EVENODD arrangement XOR's the parity result of one distinguished diagonal into the parity blocks for each of the other diagonals.

FIG. 1 is a schematic block diagram of a prior art disk array 100 that is configured in accordance with the conventional EVENODD parity arrangement. Each data block Dab belongs to parity sets a and b, where the parity block for each parity set is denoted Pa. Note that for one distinguished diagonal (X), there is no corresponding parity set. This is where the EVENODD property arises. In order to allow reconstruction from two failures, each data disk must not contribute to at least one diagonal parity set. By employing a rectangular array of n×(n–1) data blocks, the diagonal parity sets have n–1 data block members. Yet, as noted, such an arrangement does not have a location for storing the parity block for all the diagonals. Therefore, the parity of the extra (missing) diagonal parity block (X) is recorded by XOR'ing that diagonal parity into the parity of each of the other diagonal parity blocks. Specifically, the parity of the missing diagonal parity set is XOR'd into each of the diagonal parity blocks P4 through P7 such that those blocks are denoted P4X–P7X.

For reconstruction from the failure of two data disks, the parity of the diagonal that does not have a parity block is initially recomputed by XOR'ing all of the parity blocks. For example, the sum of all the row parities is the sum of all the data blocks. The sum of all the diagonal parities is the sum of all the data blocks minus the sum of the missing diagonal parity block. Therefore, the XOR of all parity blocks is equivalent to the sum of all the blocks (the row parity sum) minus the sum of all the blocks except the missing diagonal, which is just a parity of the missing diagonal. Actually, n–1 copies of the missing diagonal parity are added into the result, one for each diagonal parity block. Since n is a prime number greater than 2, n–1 is even, resulting in the XOR of a block with itself an even number of times, which results in a zero block. Accordingly, the sum of the diagonal parity blocks with the additional missing parity added to each is equal to the sum of the diagonal parity blocks without the additional diagonal parity.

Next, the missing diagonal parity is subtracted from each of the diagonal parity blocks. After two data disks fail, there are at least two diagonal parity sets that are missing only one block. The missing blocks from each of those parity sets can be reconstructed, even if one of the sets is the diagonal for which there is not a parity block. Once those blocks are reconstructed, all but one member of two of the row parity sets are available. This allows reconstruction of the missing member of those rows. This reconstruction occurs on other diagonals, which provides enough information to reconstruct the last missing block on those diagonals. The pattern of reconstructing alternately using row then diagonal parity continues until all missing blocks have been reconstructed.

Since n is prime, a cycle is not formed in the reconstruction until all diagonals have been encountered, hence all the missing data blocks have been reconstructed. If n were not prime, this would not be the case. If both parity disks are lost, a simple reconstruction of parity from data can be performed. If a data disk and the diagonal parity disk are lost, a simple RAID-4 style reconstruction of the data disk is performed using row parity followed by reconstruction of the diagonal parity disk. If a data disk and the row parity disk are lost, then one diagonal parity may be computed. The missing diagonal parity block is calculated by subtracting the computed diagonal parity from the stored diagonal parity. Reconstruction then proceeds as in the case of two lost data disks. EVENODD thus allows reconstruction from failures of both parity disks or from any combination of one data disk and one parity disk failure. The technique also allows reconstruction from any single disk failure.

EVENODD is optimal in terms of the number of disks required; however, disk efficiency for this encoding technique is achieved at the cost of reconstruction performance. EVENODD treats the entire disk array as a single unit. When any disk in the array fails, the system must access all disks in the array to reconstruct the missing blocks. If a single disk fails in an array of n data disks, 1/n of the accesses can only be satisfied by reading all n−1 remaining disks plus the row parity disk. Accesses to other disks can be satisfied by a single read operation; thus, the average number of accesses per read is 2−1/n. For large n, this means that performance of the disk array degrades by a factor of two during reconstruction. In addition, the amount of work the system must do to recover from a failure (and thus the recovery time if the system is constrained) is also proportional to the disk array size. A system with 2n disks takes twice as long to recover as a system with n disks. Together, these factors limit the practical size of a RAID group even with protection with multiple disk failures.

SUMMARY OF THE INVENTION

The present invention comprises a technique for efficiently correcting multiple storage device failures in a storage array of sub-arrays using a combination of a single failure correction across the sub-arrays and double failure correction across the entire array. The storage array comprises a plurality of concatenated sub-arrays, wherein each sub-array includes a set of data storage devices and a failure recovery device (FRD) that stores data that can be used to correct a single failure within the sub-array. The array further includes a global FRD that can be used in concert with the collection of sub-array FRDs to correct any double failure within a single sub-array.

In an embodiment of the present invention, the technique is directed to efficiently correcting multiple storage device failures in a storage array using a combination of a single diagonal parity group and multiple row parity groups. Here, the storage array comprises a plurality of concatenated sub-arrays, wherein each sub-array includes a set of data storage devices and a parity storage device. Each row parity group is associated with a sub-array of the array. The array further includes a global parity storage device holding diagonal parity computed across the concatenation of the sub-arrays.

According to an aspect of the invention, row parity is decoupled from diagonal parity. Instead of requiring that each parity group contain both a row parity device and a diagonal parity device, the array is composed of a collection of row parity groups. Diagonal parity is calculated across the full array. Diagonal parity is stored and calculated optimally for the entire array, but row parity group sizes can be optimized for reconstruction performance. For example, if the largest parity group that can recover efficiently from a single failure contains 6 storage devices, such as disks, a multi-row, diagonal array can be composed of 15 data disks, 3 row parity disks and a single diagonal parity disk. Other multiple failure protection encoded storage arrays subject to the same constraints would require 15 data disks, 3 row parity disks and 3 diagonal parity disks.

Specifically, a single diagonal parity block is calculated across a series of row parity groups. Upon the failure of any data blocks, each in an independent row parity group, the invention enables recovery of the data blocks using local row parity. Upon the failure of any two blocks within a single parity group, the invention facilitates recovery using a combination of local row parity and global diagonal parity calculations. Advantageously, the present invention allows more efficient (and easier) recovery of single failures in an array configured to enable recovery from the concurrent failure of two storage devices (disks) within a sub-array of the array.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 1 is a schematic block diagram of a prior art disk array that is configured in accordance with a conventional EVENODD parity arrangement;

DETAILED DESCRIPTION OF AN ILLUSTRATIVE EMBODIMENT

Figure 2:
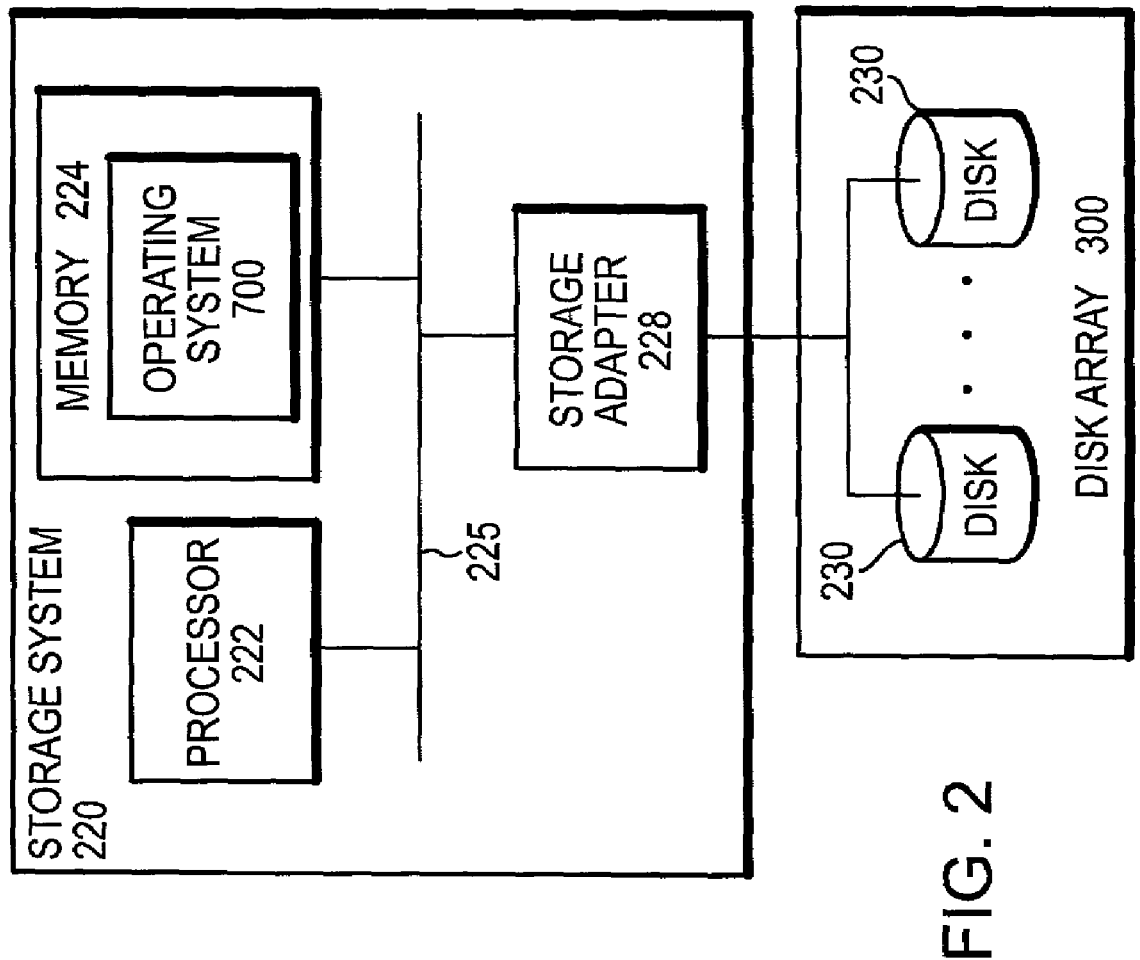
FIG. 2 is a schematic block diagram of an environment including a storage system that may be advantageously used with the present invention.

FIG. 2 is a schematic block diagram of an environment 200 including a storage system 220 that may be advantageously used with the present invention. The inventive technique described herein may apply to any type of special-purpose (e.g., file server or filer) or general-purpose computer, including a standalone computer or portion thereof, embodied as or including a storage system 220. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 220 comprises a processor 222, a memory 224 and a storage adapter 228 interconnected by a system bus 225. The memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 700, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The storage adapter 228 cooperates with the storage operating system 700 executing on the system 220 to access information requested by a user (or client). The information may be stored on any type of attached storage array of writeable storage element media such as video tape, optical, DVD, magnetic tape, bubble memory, electronic random access memory, micro-electro mechanical and any other similar media adapted to store information, including data and parity information. However, as illustratively described herein, the information is stored on storage devices such as the disks 230 (HDD and/or DASD) of storage array 300. The storage adapter includes input/output (I/O) interface circuitry that couples to the disks over an I/O interconnect arrangement, such as a conventional high-performance, Fibre Channel serial link topology.

Storage of information on array 300 is preferably implemented as one or more storage "volumes" that comprise a cluster of physical storage disks 230, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises a technique for efficiently correcting multiple storage device failures in a storage array of sub-arrays using a combination of a single failure correction across the sub-arrays and double failure correction across the entire array. The storage array comprises a plurality of concatenated sub-arrays, wherein each sub-array includes a set of data storage devices and a failure recovery device (FRD) that stores data that can be used to correct a single failure within the sub-array. The array further includes a global FRD that can be used in concert with the collection of sub-array FRDs to correct any double failure within a single sub-array.

In an embodiment of the present invention, the technique is directed to efficiently correcting multiple storage device failures in a storage array using a combination of a single diagonal parity group and multiple row parity groups. Here, the storage array comprises a plurality of concatenated sub-arrays, wherein each sub-array includes a set of data storage devices and a parity storage device. Each row parity group is associated with a sub-array of the array. The array further includes a global parity storage device holding diagonal parity computed across the concatenation of the sub-arrays.

According to an aspect of the invention, row parity is decoupled from diagonal parity. Instead of requiring that each parity group contain both a row parity device and a diagonal parity device, the array is composed of multiple row parity groups. Diagonal parity is calculated across the full array (either with or without the parity devices). Diagonal parity is stored and calculated optimally for the entire array, but row parity group sizes can be optimized for reconstruction performance. For example, if the largest parity group that can recover efficiently from a single failure contains 6 storage devices, such as disks, a multi-row, diagonal array can be composed of 15 data disks, 3 row parity disks and a single diagonal parity disk. Other multiple failure protection encoded storage arrays subject to the same constraints would require 15 data disks, 3 row parity disks and 3 diagonal parity disks.

Specifically, a single diagonal parity block is calculated across a series of row parity groups. Upon the failure of any data blocks, each in an independent row parity group, the invention enables recovery of the data blocks using local row parity. Upon the failure of any two blocks within a single parity group, the invention facilitates recovery using a combination of local row parity and global diagonal parity calculations. Advantageously, the present invention allows more efficient (and easier) recovery of single failures in an array configured to enable recovery from the concurrent failure of two storage devices (disks) within a sub-array of the array.

More generally, consider an array A of storage elements containing a collection N of data disks, and FRD-1, -2. Assume that a method E used to encode FRD-1 has the following "additive" property: Given an array X and an array Y, a concatenated array XY can be formed and there exists a method M such that M (FRD-1 (X), FRD-1 (Y)) =FRD-1 (XY). For any such array, there exists a derived encoding E', where instead of a single FRD-1 for the entire array, the array consists of a sequence or concatenation of sub-arrays (Ck) and each Ck is locally protected by FRD-1 (Ck). For double failures, the array as a whole is protected by FRD-2 (A). If FRD-1 (A) is needed in order to apply the double failure recovery method, it can be obtained through repeated application of the appropriate methods M.

Now consider any double failure protection encoding E consisting of an array of data disks, a row parity value stored on one parity disk and a second calculation across either all data disks or the data disks and the row parity disk together. Note that the second calculation result is stored on a separate device. For any such encoding, there exists a derived encoding E', where instead of a single row parity disk for the entire array, the array consists of a sequence or concatenation of sub-arrays. Each sub-array is associated with, and protected by, a row parity disk. The secondary parity value is still calculated as in E.

During reconstruction, a failure to a disk of each independent sub-array is recovered using local parity. If two data disks fail in the same sub-array, all parity disks can be exclusively OR'd (XOR'd) together to form a row parity disk corresponding to the row parity disk in the original encoding E, and the reconstruction can proceed. If a parity disk and a data disk fail, the condition reduces to E where a data disk and the row parity disk have failed. E's reconstruction algorithm can be run to recover the failed data disk and the data disk can then be used to regenerate the failed row parity (if necessary).

Figures 3, 4:
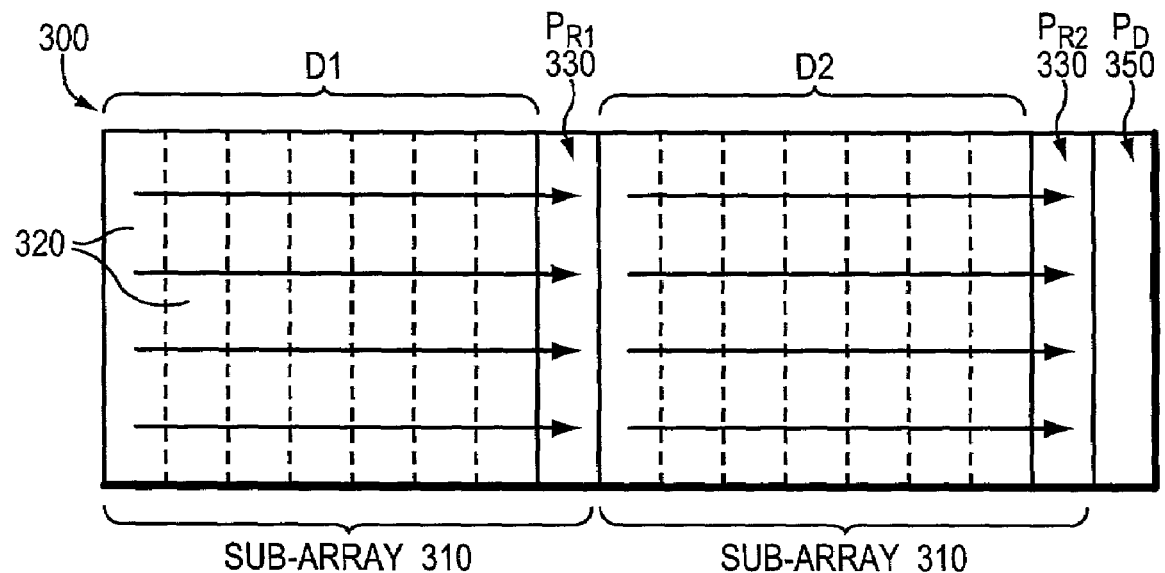
FIG. 3 is a schematic block diagram of a storage array comprising a plurality of concatenated sub-arrays that may advantageously used with the present invention.
FIG. 4 is a schematic block diagram of a disk array organized in accordance with a row-diagonal (R-D) parity encoding technique.

FIG. 3 is a schematic block diagram of storage array 300 organized as a plurality of concatenated sub-arrays 310, wherein each sub-array includes a set of data disks ($D_1$, $D_2$) and a parity disk ($P_{R1}$, $P_{R2}$). Illustratively, each sub-array 310 is arranged as a concentrated parity, e.g., a RAID-4 style, disk array [A0, A2 . . . An] comprising a predetermined number (e.g., seven) of data disks 320 and a row parity disk 330. The cardinality of each sub-array is denoted by Ck (k=0 . . . n).

In order to enable recovery from the concurrent failure of two disks in the array, a single diagonal parity disk is provided for the entire array instead of a diagonal parity disk for each sub-array (and row parity disk) of the array. Therefore, the array further includes a global parity disk $P_D$ 350 holding diagonal parity for the single diagonal parity group, which parity is computed across the concatenation of the sub-arrays 310 of array 300. Double failures within a sub-array 310 can be corrected using only one global diagonal parity disk 350 associated with the entire array. The novel technique thus reduces the number of disks needed to enable efficient recovery from the concurrent failure of two storage devices (disks) in the array.

In the illustrative embodiment described herein, two concatenations of sub-arrays 310 are considered, one based on "row-diagonal" encoding and the other based on conventional EVENODD encoding. Row-diagonal (R-D) encoding is a parity technique that provides double failure parity correcting recovery using row and diagonal parity in a disk array. Two disks of the array are devoted entirely to parity while the remaining disks hold data. The contents of the array can be reconstructed entirely, without loss of data, after any one or two concurrent disk failures. An example of a R-D parity technique that may be advantageously used with the present invention is disclosed in the co-pending and commonly-owned U.S. patent application Ser. No. 10/035,607 filed on Dec. 28, 2001 now Issued U.S. Pat. No. 6,993,701 on Jan. 31, 2006 titled Row-Diagonal Parity Technique for Enabling Efficient Recovery from Double Failures in a Storage Array.

FIG. 4 is a schematic block diagram of a disk array 400 organized in accordance with the R-D parity encoding technique. Assume n equals the number of disks in the array, where n=a prime number p+1. The first n−2 disks (D0–3) hold data, while disk n−1 (RP) holds row parity for the data disks D0–D3 and disk n (DP) holds diagonal parity. The disks are divided into blocks and the blocks are grouped into stripes, wherein each stripe equals n−2 rows. The diagonal parity disk stores parity information computed along diagonal parity sets ("diagonals") of the array. The blocks in the stripe are organized into p diagonals, each of which contains p−1 blocks from the data and row parity disks, and all but one of which contains a parity block on the diagonal parity disk. In addition, there are n−1 diagonals per stripe.

The data blocks and the row parity blocks are numbered such that each block belongs to a diagonal parity set and, within each row, each block belongs to a different diagonal parity set. The notation $D_{a,b}$ and $P_{a,b}$ denotes the respective contributions of data (D) and parity (P) blocks to specific row (a) and diagonal (b) parity computations. That is, the notation $D_{a,b}$ means that those data blocks belong to the row or diagonal used for purposes of computing row parity a and diagonal parity b, and $P_{a,b}$ stores the parity for row parity set a and also contributes to diagonal parity set b. For example, $P_{0,8}=D_{0,4}\char`\^D_{0,5}\char`\^D_{0,6}\char`\^D_{0,7}$, wherein "^" represents an XOR operator. The notation also includes the row parity block used for purposes of computing the diagonal parity for a particular diagonal, e.g., $P_4=D_{0,4}\char`\^D_{3,4}\char`\^D_{2,4}\char`\^P_{1,4}$. Note that each of the diagonal parity blocks stored on the diagonal parity disk represents contributions from all but one of the other disks (including the row parity disk) of the array. For example, the diagonal parity block $P_4$ has contributions from D0 ($D_{0,4}$), D2 ($D_{3,4}$), D3 ($D_{2,4}$) and RP ($P_{1,4}$), but no contribution from D1. Note also that the diagonal parity for diagonal 8 ($P_8$) is neither computed nor stored on the diagonal parity disk DP.

Specifically, the diagonal parity blocks on disk DP include the row parity blocks in their XOR computation. In other words, the diagonal parity stored on the disk DP is computed not only in accordance with the contents of the data disks but also with the contents of the row parity disk. Moreover, the diagonal parity disk contains parity blocks for each of the diagonals of a stripe except one. By encoding the diagonal parity blocks as shown in array 400, the system can recover from any two concurrent disk failures despite the missing diagonal parity ($P_8$). This results from the fact that the row parity blocks are factored into the computations of the diagonal parity blocks stored on the diagonal parity disk DP.

The recovery (reconstruction process) aspect of the R-D parity technique is invoked when two data disks (or one data disk and a row parity disk) within a sub-array are concurrently lost due to failure. With any combination of two failed data disks (or one data disk and a row parity disk), row parity cannot be immediately used to reconstruct the lost data; only diagonal parity can be used. Given the structure and organization of the array (i.e., the stripe length and stripe depth are not equal) each diagonal does not include (misses) a block from one of the disks. Therefore, when the two data disks are lost, two diagonals have lost only one member, i.e., for each of the two lost disks, there is one diagonal that does not intersect that disk, therefore no block from that diagonal is lost because of the failure of that disk. A diagonal parity block is stored on the diagonal parity disk for all but one diagonal; therefore, reconstruction of at least one, and usually two, of the missing blocks is initiated using diagonal parity.

Once a missing block is reconstructed, reconstruction of a row may be completed by reconstructing the other missing block on that row using row parity. When that other block is reconstructed, a determination is made as to whether the block belongs to a diagonal for which there is stored parity. If the block belongs to a diagonal for which there is parity, the other missing block on that diagonal can be reconstructed from the other disk that is on that diagonal using diagonal parity. That is, for all but the missing diagonal, once one block on the diagonal is reconstructed, the other can be reconstructed. The other missing block in that row parity set is then reconstructed. However, if the block belongs to a diagonal for which there is no parity (i.e, the missing diagonal), then a determination is made as to whether all blocks have been reconstructed. If not, the pattern of first reconstructing based on diagonal parity, then on row parity, continues until the last data block used in computation of the missing diagonal parity set is reached. Once all blocks have been reconstructed, the reconstruction process is complete.

Figure 5:
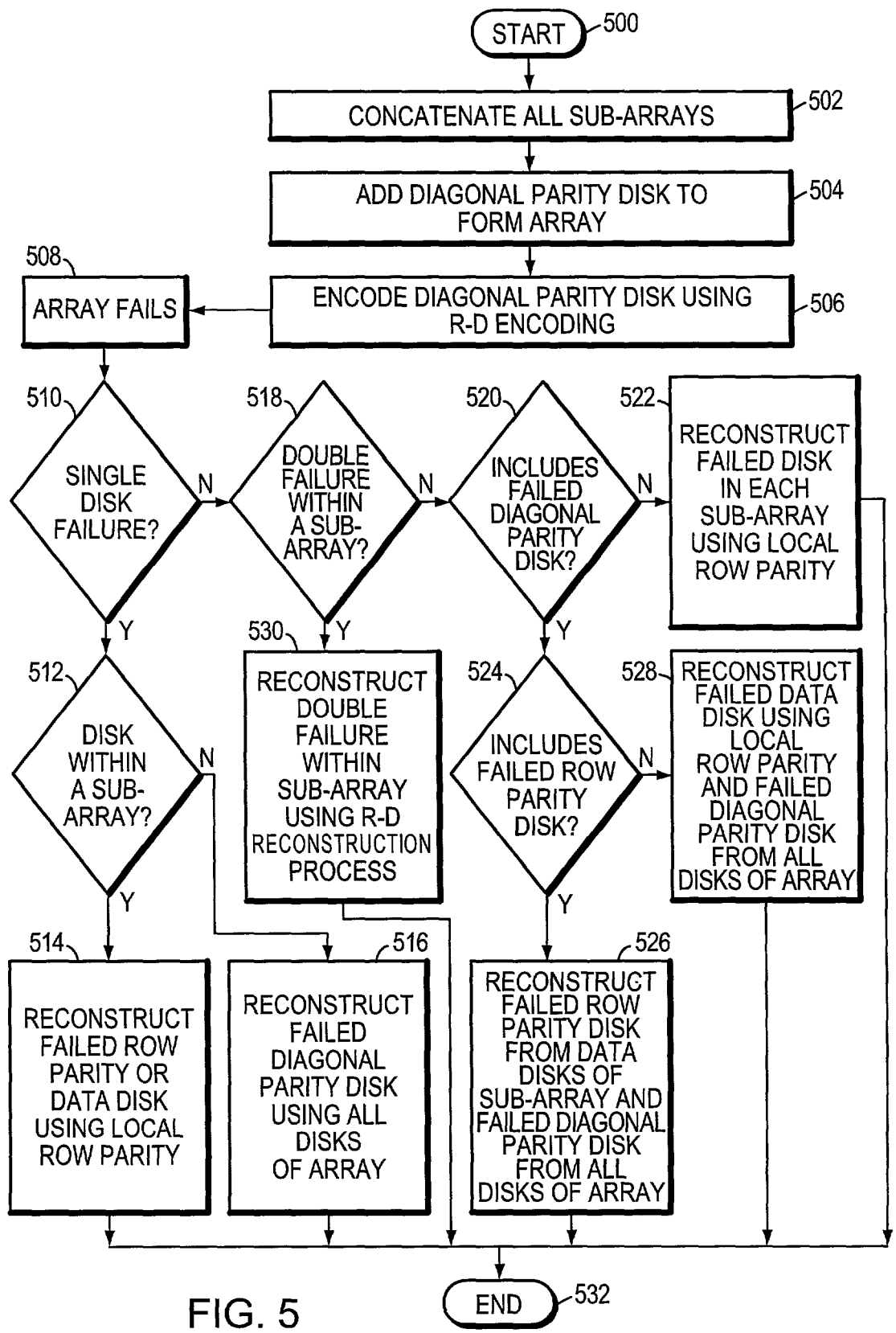
FIG. 5 is a flowchart illustrating the sequence of steps comprising a novel multiple failure correcting technique applied to a concatenation of sub-arrays based on R-D encoding in accordance with the present invention.

FIG. 5 is a flowchart illustrating the sequence of steps comprising the novel multiple failure correcting technique as applied to storage array 300 having a concatenation of sub-arrays 310 based on R-D encoding. The sequence starts in Step 500 and proceeds to Step 502 where all sub-arrays A[0–n], including row parity disks 330, are concatenated such that the total number of data and row parity disks over all Ck is relatively prime to all numbers less than or equal to max(Ck)–1. In Step 504, the diagonal parity disk 350 is added to form array 300. In Step 506, the contents of the diagonal parity disk 350 are encoded according to the R-D parity technique, with the entire array taking the place of a concentrated parity configuration, analogous to a RAID-4 style configuration, where all the parity information is stored on two disks.

In Step 508, the array fails. If the failure is a single disk failure (Step 510), a determination is made in Step 512 as to whether the failure is to a disk in a sub-array. If so, the failed data or row parity disk is reconstructed in Step 514 using local row parity associated with that sub-array. The sequence then ends in Step 532. If the single failure is not to a disk of a sub-array, the failed global diagonal parity disk is reconstructed in Step 516 using all disks (data and row parity disks) of all sub-arrays of the entire array. This is because the diagonal parity sets (i.e., diagonals) span the entire array of disks. The sequence then ends in Step 532.

If the failure is not a single disk failure, a determination is made in Step 518 as to whether the array failure is a double failure within a sub-array. If not, a determination is made in Step 520 as to whether one of the failures includes the diagonal parity disk. If not, each disk failure is either a data or row parity disk failure that occurs in a different sub-array and, in Step 522, the failed disk in each sub-array is reconstructed using local row parity. The sequence then ends in Step 532.

If one of the failures includes the global diagonal parity disk, then a determination is made is Step 524 as to whether the other failed disk includes a row parity disk. If so, failures to a row parity disk and the diagonal parity disk are reconstructed by first reconstructing the failed row parity disk from the data disks of the sub-array and then reconstructing the diagonal parity disk from all disks of the array (Step 526). The sequence then ends in Step 532. If not, failures to a data disk and the diagonal disk are reconstructed by first reconstructing the data disk from local row parity associated with the sub-array and then reconstructing the diagonal parity disk from all disks of the array (Step 528). The sequence then ends in Step 532.

In Step 530, two disk failures (a double failure) within a sub-array are globally recovered using the R-D reconstruction process. Here, two failures occur within disks protected by the same row parity; therefore, diagonal parity is needed for reconstruction. Since the conditions on the diagonal parity disk are the same as described with respect to the R-D parity technique, the diagonal parity disk is used to recover at least one data block within the failed sub-array. Once that block is recovered, row parity within the sub-array is used to recover the corresponding block in the other failed disk. This process continues in accordance with the R-D reconstruction process. The sequence then ends in Step 532.

Notably, a difference between the present technique and the R-D technique is the observation that any number of disks in the array may be row parity disks. The row parity disks essentially define sub-arrays within the array. Reconstruction based on local row parity involves only data disks (i.e., row parity sets) of the sub-array. Therefore, the inventive correcting technique allows more efficient (and easier) recovery of single failures in array 300 adapted to enable recovery from concurrent failures of two disks within a sub-array.

Advantageously, the invention allows adding of a single diagonal parity disk to an existing array of data and row parity disks to thereby provide protection against double failures in the array. The R-D parity reconstruction algorithm may then be applied to the array provided that the same relationship with respect to prime numbers is maintained. That is, the total number of data and row parity disks of the array 300 must be equivalent to the total number of data and row parity disks in the R-D parity arrangement. The dependency on the number of disks being "prime" relates to the function of diagonal parity (as opposed to row parity). Specifically, the number of diagonals is relatively prime to all numbers less than or equal to max(Ck)–1, so the sum over Ck is equal to the number of diagonals.

It should be further noted that the technique described herein is capable of correcting more than two failures in the array 300, provided that there are no more than two failures in any one sub-array, and that there is no more than one sub-array with two failures, and that if there are two failures in any sub-array, that the diagonal parity disk has not also failed. For example, assume there are three sub-arrays, each comprising a row parity disk. The present invention enables recovery from a single disk (data or row parity) failure within each sub-array, or a total of three disk failures within the entire array. In the case of two disk failures within a single sub-array, reconstruction begins by locating a diagonal parity set that has lost only one member. That is, reconstruction begins with a missing block from diagonal parity of a diagonal parity set not represented on one of the failed disks. From there, reconstruction of the other missing block in the row parity set can be effected, with the row-diagonal reconstruction procedure continuing until the last data block used in computation of the missing diagonal parity set is reached.

Figure 6:
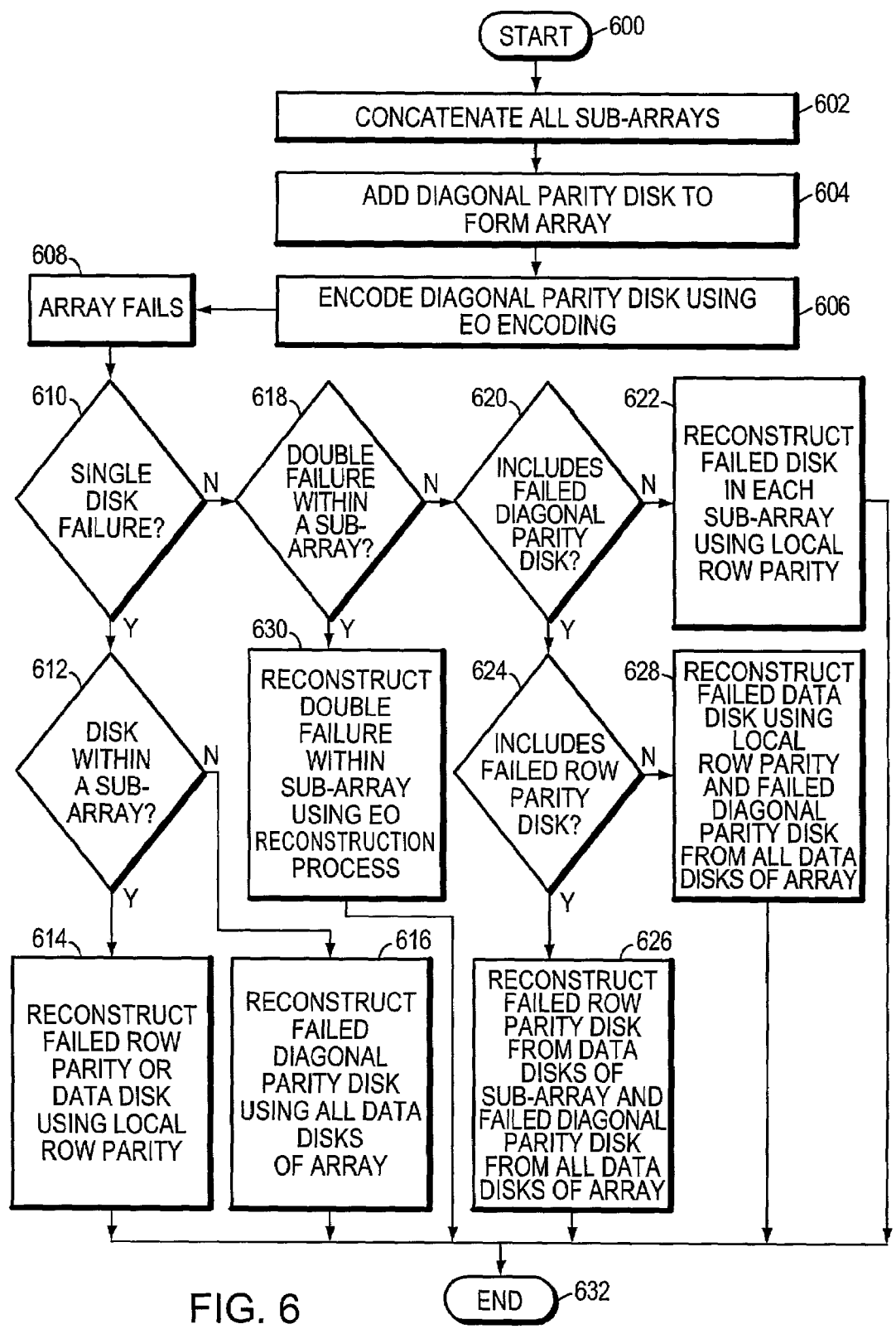
FIG. 6 is a flowchart illustrating the sequence of steps comprising the novel multiple failure correcting technique as applied to a concatenation of sub-arrays based on EVENODD encoding.

FIG. 6 is a flowchart illustrating the sequence of steps comprising the novel multiple failure correcting technique as applied to storage array 300 having a concatenation of sub-arrays 310 based on conventional EVENODD (EO) encoding. The sequence starts in Step 600 and proceeds to Step 602 where all sub-arrays A[0–n] are concatenated in sequence and wherein all row parity disks are removed from the final sequence. This is referred to as C-EO. In keeping with the definitions for the EO algorithm, the sum of all Ck from 0–n is equal to m+n+1, where m is a prime number. In Step 604, the diagonal parity disk 350 is added to form array 300. In Step 606, the contents of the diagonal parity disk $P_D$ are encoded according to the conventional EO technique, with the exception that row parity is not derived from the entire array; rather, row parity is derived from each sub-array of the entire array.

In Step 608, the array fails. If the failure is a single disk failure (Step 610), a determination is made in Step 612 as to whether the failure is to a disk in a sub-array. If so, the failed data or row parity disk is reconstructed in Step 614 using local row parity associated with that sub-array. The sequence then ends in Step 632. If the single failure is not to a disk of a sub-array, the failed global diagonal parity disk is reconstructed in Step 616 using all data disks of all sub-arrays of the entire array. Note that the parity result of a distinguished "missing" diagonal is XOR'd into the parity blocks for each of the other diagonals. This is because there is one more diagonal than there are blocks to store the parity blocks for the diagonals. The sequence then ends in Step 632.

If the failure is not a single disk failure, a determination is made in Step 618 as to whether the array failure is a double failure within a sub-array. If not, a determination is made in Step 620 as to whether one of the failures includes the diagonal parity disk. If not, each disk failure is either a data or row parity disk failure that occurs in a different sub-array and, in Step 622, the failed disk in each sub-array is reconstructed using local row parity. The sequence then ends in Step 632.

If one of the failures includes the global diagonal parity disk, then a determination is made is Step 624 as to whether the other failed disk includes a row parity disk. If so, failures to a row parity disk and the diagonal parity disk are reconstructed by first reconstructing the failed row parity disk from the data disks of the sub-array and then reconstructing the diagonal parity disk from all of the data disks (Step 626). The sequence then ends in Step 632. If not, failures to a data disk and the diagonal disk are reconstructed by first reconstructing the data disk from local row parity associated with the sub-array and then reconstructing the diagonal parity disk from all of the data disks (Step 628). The sequence then ends in Step 632. In general, any double failure involving the diagonal parity disk reduces to local reconstruction of one failed disk followed by reconstruction of the diagonal parity disk.

Reconstruction using EO encoding is more complicated then using RD encoding because, in order to recover from double failures within a sub-array, the value of the missing diagonal must be initially reconstructed for EO encoding. A key observation to the present invention is that reconstruction from double data disk failures in the same parity group begins by adding (summing) together all parity blocks (from all row parity disks and the diagonal parity disk) to compute the missing diagonal parity block. This is similar to the conventional EO technique except that the present invention uses different row parity disks to protect different sub-arrays of the array. Thereafter, all of the diagonal parity blocks are employed when reconstructing data using diagonal parity.

In Step 630, two disk failures within a sub-array are globally recovered using the EO reconstruction process. In the case of two data disk failures from the same sub-array, the failed data disks are reconstructed by adding together all of the (row and diagonal) parity blocks to compute the parity of the missing diagonal. From that, the parities of all the other diagonals can be computed. As noted, each diagonal parity set misses one data disk; thus the missing data block (disk) from a diagonal can be reconstructed, then the missing member of the row parity set can be reconstructed. Essentially, if both failed disks are data disks, the situation reduces to conventional EO reconstruction with an optimization that all row parity calculations can be made within a sub-array instead of across the entire array (diagonal parity calculations span the entire array, as in conventional EO). The equivalent of the global row parity (used to decode diagonal parity) is then obtained by summing across all row parity disks.

In the case of a row parity disk failure and a data disk failure from the same sub-array, the failed disks are reconstructed by first reconstructing the extra parity block for the missing diagonal, since it is just the parity value of any of the diagonal parity sets, and one of the diagonal parity sets must survive, since only one data disk is missing, and there is one diagonal parity set that does not include a block from that data disk. Once the parity of the missing diagonal is reconstructed, the parity of all the other diagonals can be computed. Once the parity of all the diagonals is computed, the entire missing data disk can be reconstructed, as each block on it is a member of one diagonal and each diagonal is missing at most one block (one diagonal is missing no blocks). Finally, row parity from the data disks is reconstructed. The sequence then ends in Step 632.

While the sum over Ck is restricted to match the primality requirements of EO, full primality is not needed. Since all double failure recovery takes place within sub-arrays, the step size is bounded not by the sum of Ck but by the maximum value of Ck. In order to ensure that all reconstruction progressions cover the data, it is only necessary that C'−(n+1) be relatively prime to all numbers less than or equal to max(Ck)−1.

Figure 7:
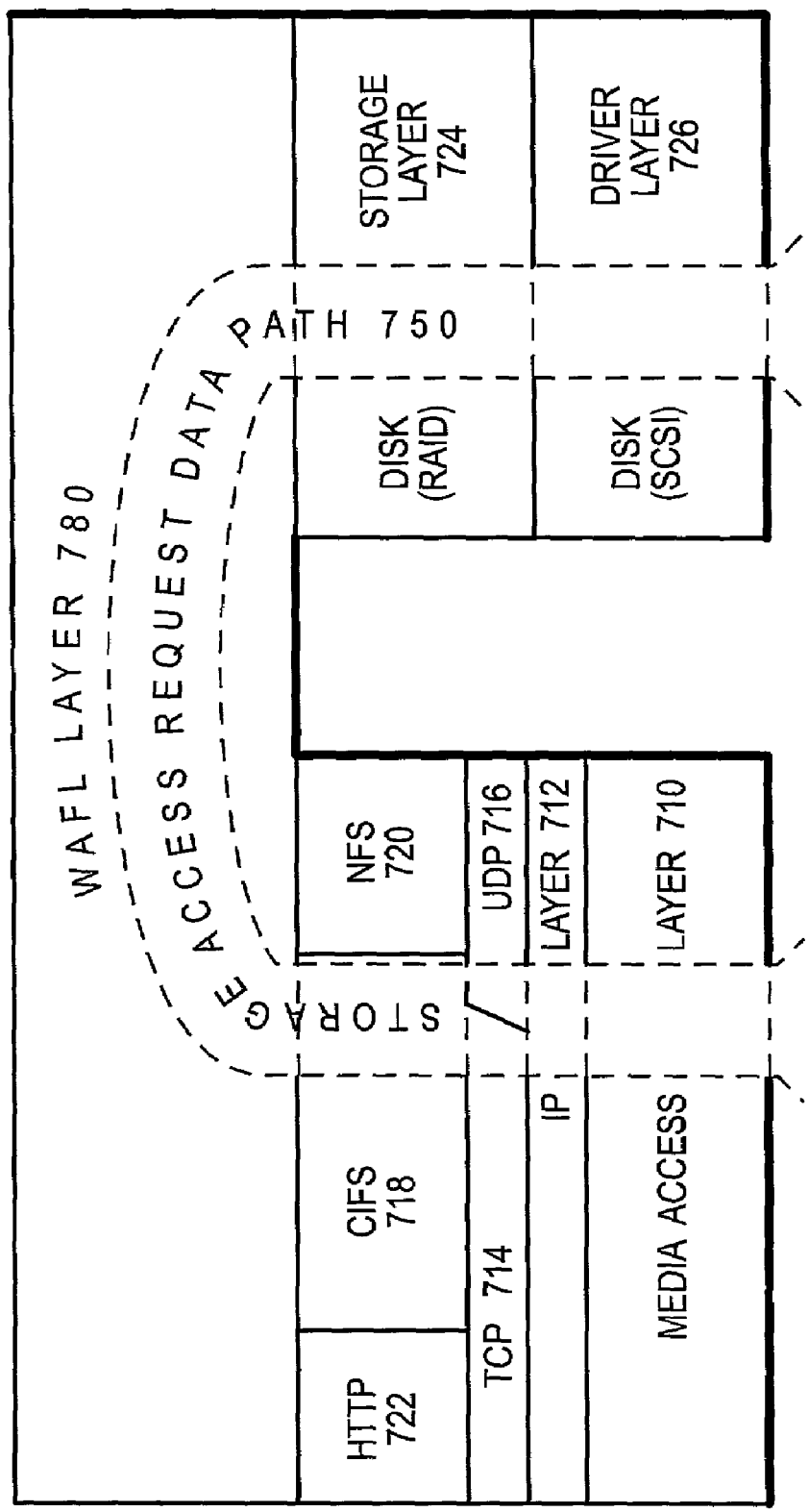
FIG. 7 is a schematic block diagram of a storage operating system that may be advantageously used with the present invention.

FIG. 7 is a schematic block diagram of the storage operating system 700 that may be advantageously used with the present invention. In the illustrative embodiment, the storage operating system is preferably the NetApp® Data ONTAP™ operating system available from Network Appliance, Inc., Sunnyvale, Calif. that implements a Write Anywhere File Layout (WAFL™) file system. As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented, for example, as an application program operating over a general-purpose operating system, such as UNIX® or Windows NT®, or as a general-purpose operating system with storage functionality or with configurable functionality, which is configured for storage applications as described herein.

The storage operating system comprises a series of software layers, including a media access layer 710 of network drivers (e.g., an Ethernet driver). The operating system further includes network protocol layers, such as the Internet Protocol (IP) layer 712 and its supporting transport mechanisms, the Transport Control Protocol (TCP) layer 714 and the User Datagram Protocol (UDP) layer 716. A file system protocol layer provides multi-protocol data access and, to that end, includes support for the Common Internet File System (CIFS) protocol 718, the Network File System (NFS) protocol 720 and the Hypertext Transfer Protocol (HTTP) protocol 722. In addition, the operating system 700 includes a disk storage layer 724 that implements a disk storage protocol, such as a RAID protocol, and a disk driver layer 726 that implements a disk access protocol such as, e.g., a Small Computer Systems Interface (SCSI) protocol. Bridging the disk software layers with the network and file system protocol layers is a WAFL layer 780 that preferably implements the WAFL file system.

It should be noted that the software "path" through the storage operating system layers described above needed to perform data storage access for a user request received at the storage system may alternatively be implemented in hardware. That is, in an alternate embodiment of the invention, the storage access request data path 750 may be implemented as logic circuitry embodied within a field programmable gate array (FPGA) or an application specific integrated circuit (ASIC). This type of hardware implementation may increase the performance of the service provided by system 220 in response to a user request. Moreover, in another alternate embodiment of the invention, the processing elements of adapter 228 may be configured to offload some or all of the storage access operations from processor 222 to thereby increase the performance of the service provided by the storage system. It is expressly contemplated that the various processes, architectures and procedures described herein can be implemented in hardware, firmware or software.

The illustrative embodiments set forth herein are described with respect to a concentrated parity arrangement. In yet another alternate embodiment of the invention, the inventive technique can be utilized in connection with other sub-array organizations, such as a distributed parity arrangement (e.g., RAID-5). However, a scaling aspect of the present invention (i.e., the ability to add disks to the array in the future) practically applies to only the concentrated parity technique, since the configuration of diagonal parity sets takes into account the existence of "imaginary" (absent) disks having zero-valued blocks. This type of scaling would be quite difficult using a distributed parity arrangement wherein the rotated parity may fall on such imaginary disks.

While there have been shown and described illustrative embodiments for efficiently correcting multiple storage device failures in a storage array using a combination of a single diagonal parity group and multiple row parity groups, wherein each row parity group is associated with a sub-array of the array, it is to be understood that various other adaptations and modifications may be made within the spirit and scope of the invention. For example, the invention generally applies to a data protection technique that protects against the loss of two data elements, where protection is obtained by adding (to each data element) a row parity element and a second element using any encoding and decoding method. The data protection technique can be imbedded within another technique that protects sub-arrays with local parity elements to protect against single element failures, and uses the encoding and decoding method of the inventive technique only when more than one failure occurs in one sub-array.

To illustrate, assume an encoding method (E) and a decoding method (D) that can be used to protect n data elements (e.0 . . . e.n−1), for n≧2, where E is used to encode two data recovery elements R.e and R'.e, and where D is used to recover the contents of any e.k (k<n). Assume further that the encoding of R is additive. In this context, additive means that for a given j (0<j<n−1) two arrays, e.g., (f.0 . . . f.j) and (1.0 . . . 1.n−j−2), can be formed, where f.k=e.k for k=0 to j and 1.k=e.j+k+1 for k=0 to n−j−2. Furthermore there exists an operation independent of j that combines the resulting R.f and R.1 to obtain R.e. For example, if R.e is the row parity disk in the R-D encoding, R.e can always be obtained from the XOR of R.f and R.1, regardless of the chosen j.

The data element array can thus be decomposed into a collection of sub-arrays s0 . . . sM−1. For each sub-array K from 0 to M−1, R.sK is encoded. Although there is no attempt to encode R'.sK, the encoding method E is used to encode R'.e. Since R'.e and all R.sK are encoded from the data elements, any all such derived data elements can be eliminated and reconstructed from the encoding methods.

To reconstruct any single data element or several such elements from distinct sub-arrays, the decoding method D can be used across its containing sub-array, in a mode that assumes the absence of a data element and the second calculated element R' (call this sub-method D(R)). In R-D and EO, for example, this means reconstructing the sub-array based purely on row parity of the sub-array.

To simultaneously reconstruct two data elements within a single sub-array, the method D is run across the entire array, reconstructing R.e when necessary as the sum of all R.sK. If one step in the method D involves reconstructing a portion of a data element using DR, that step can be run across the sub-array, using DR with R.sK, rather than across the entire array with R.e.

To reconstruct a single data element in a sub-array without using R.sK, method D is run across the entire array using a mode that excludes R.e. If a step in this process first reconstructs R.e (or a portion thereof) and then uses the reconstructed R.e. to reconstruct a portion of the absent data element, the reconstructed R.e can instead be used to reconstruct R.sK (by subtraction of the other R.sK from R.e). DR can then be used to reconstruct the data element from the sub-array.

In an alternate embodiment, the present invention can be used in the area of communications as a forward error correction technique that enables, e.g., multicast distribution of data over long latency links (e.g., satellite). In this embodiment, the data may be divided into storage elements, such as packets, with every pth packet containing the row parity XOR of the previous p−1 packets. A packet containing diagonal parity is sent after every n sets of p packets. If one packet is dropped in a set of p, it is recoverable from the row parity. If two packets are dropped in one set of p, recovery may be achieved using diagonal parity.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

The invention claimed is:

1. A system to correct multiple storage device failures in a storage array using a combination of multiple first parity groups and a single secondary parity group, the system comprising:

a storage array having a plurality of concatenated sub-arrays, each sub-array including a set of data storage devices and a first parity storage device, the array further including a global secondary storage device associated with the storage array and holding secondary parity values for the single secondary parity group, the secondary parity values computed across the concatenation of the sub-arrays.

2. The system of claim 1 wherein the first parity group is a row parity group, the first parity storage device is a row parity storage device and wherein each row parity group is associated with one of the sub-arrays of the storage array such that the array is composed of the multiple row parity groups.

3. The system of claim 2 wherein the secondary parity group is a diagonal parity group, the secondary storage device is a diagonal parity storage device and wherein the secondary parity values are diagonal parity values.

4. The system of claim 3 further comprising:

a storage operating system configured to implement double failure protection encoding of the concatenated sub-arrays, wherein row parity values for each sub-array are stored on each row parity storage device and diagonal parity values for the entire array are stored on the global diagonal parity storage device; and a processing element configured to execute the storage operating system to thereby invoke storage access operations to and from the array in accordance with the double failure protection encoding.

5. The system of claim 4 wherein the double failure protection encoding is row-diagonal parity encoding.

6. The system of claim 4 wherein the double failure protection encoding is EVENODD parity encoding.

7. The system of claim 1 wherein each sub-array is organized as a concentrated parity disk array.

8. The system of claim 1 wherein each sub-array is organized as a distributed parity disk array.

9. The system of claim 1 wherein the storage devices are video tape, magnetic tape, optical, DVD, bubble memory, electronic random access memory or magnetic disk devices.

10. A method for correcting double failures in a storage array using a combination of a single diagonal parity group and multiple row parity groups, the method comprising the steps of:
organizing the storage array as a plurality of concatenated sub-arrays based on double failure protection encoding, each sub-array including a set of data storage devices and a row parity storage device, the storage array further including a global diagonal parity storage device for holding diagonal parity;
computing the diagonal parity for the single diagonal parity group across the concatenated sub-arrays; and
correcting storage device failure within the array using the row parity storage device associated with each sub-array and the global diagonal parity storage device associated with the storage array.

11. A method for correcting double failures in a storage array using a combination of a single diagonal parity group and multiple row parity groups, the method comprising the steps of:
organizing the storage array as a plurality of concatenated sub-arrays based on double failure protection encoding, each sub-array including a set of data storage devices and a row parity storage device, the storage array further including a global diagonal parity storage device for holding diagonal parity;
computing the diagonal parity for the single diagonal parity group across the concatenated sub-arrays;
correcting storage device failure within the array using the row parity storage device associated with each sub-array and the global diagonal parity storage device associated with the storage array;
encoding the double failure protection as row-diagonal parity encoding;
determining whether the storage device failure is to a single storage device in a sub-array;
if the storage device failure is to a single storage device in the sub-array, reconstructing the failed storage device using local row parity associated with the sub-array; and
if the storage device failure is not to a single storage device in the sub-array, reconstructing the failed global diagonal parity storage device using all data and row parity storage devices of all sub-arrays of the array.

12. The method of claim 11 wherein the step of correcting storage device failure further comprises the steps of:
if the storage device failure is not a single storage device failure, determining whether the storage device failure is a double failure within the sub-array;
if the storage device failure is not a double failure within the sub-array, determining whether one of the failures includes the diagonal parity storage device; and if one of the failures does not include the diagonal parity storage device, reconstructing the failed storage device in each sub-array using local row parity.

13. The method of claim 12 wherein the step of correcting storage device failure further comprises the steps of:
if one of the failures includes the diagonal parity storage device, determining whether another of the failed storage devices includes a row parity storage device;
if the another of the failed storage devices includes the row parity storage device, reconstructing the row parity storage device from the data storage devices of the sub-array; and
reconstructing the diagonal parity storage device from all data and row parity storage devices of all sub-arrays of the array.

14. The method of claim 13 wherein the step of correcting storage device failure further comprises the steps of:
if the another of the failed storage devices does not include the row parity storage device, reconstructing the data storage device using local row parity associated with the sub-array; and
reconstructing the diagonal parity storage device from all data and row parity storage devices of all sub-arrays of the array.

15. The method of claim 14 wherein the step of correcting storage device failures further comprises the step of, if the storage device failure is a double failure within the sub-array, recovering two failed storage devices within the sub-array using a row-diagonal reconstruction process.

16. The method of claim 15 wherein the step of recovering comprises the steps of:
using the diagonal parity storage device to recover at least one data block from a first of the failed storage devices of the sub-array; and
once the data block is recovered, using row parity within the sub-array to recover a corresponding block in a second of the failed storage devices.

17. The method of claim 11 further comprising the step of organizing each sub-array as a concentrated parity disk array.

18. The method of claim 11 further comprising the step of organizing each sub-array as a distributed parity disk array.

19. A method for correcting double failures in a storage array using a combination of a single diagonal parity group and multiple row parity groups, the method comprising the steps of:
organizing the storage array as a plurality of concatenated sub-arrays based on double failure protection encoding, each sub-array including a set of data storage devices and a row parity storage device, the storage array further including a global diagonal parity storage device for holding diagonal parity;
computing the diagonal parity for the single diagonal parity group across the concatenated sub-arrays;
correcting storage device failure within the array using the row parity storage device associated with each sub-array and the global diagonal parity storage device associated with the storage array;
encoding the double failure protection as EVENODD parity encoding;
determining whether the storage device failure is to a single storage device in a sub-array;
if the storage device failure is to a single storage device in the sub-array, reconstructing the failed storage device using local row parity associated with the sub-array; and if the storage device failure is not to a single storage device in the sub-array, reconstructing the failed global diagonal parity storage device using all data storage devices of all sub-arrays of the array.

20. The method of claim 19 wherein the step of correcting storage device failure further comprises the steps of:
   if the storage device failure is not a single storage device failure, determining whether the storage device failure is a double failure within the sub-array;
   if the storage device failure is not a double failure within the sub-array, determining whether one of the failures includes the diagonal parity storage device; and
   if one of the failures does not include the diagonal parity storage device, reconstructing the failed storage device in each sub-array using local row parity.

21. The method of claim 20 wherein the step of correcting storage device failure further comprises the steps of:
   if one of the failures includes the diagonal parity storage device, determining whether another of the failed storage devices includes a row parity storage device;
   if the another of the failed storage devices includes the row parity storage device, reconstructing the row parity storage device from the data storage devices of the sub-array; and
   reconstructing the diagonal parity storage device from all of the data storage devices of the array.

22. The method of claim 21 wherein the step of correcting storage device failure further comprises the steps of:
   if the another of the failed storage devices does not include the row parity storage device, reconstructing the data storage device using local row parity associated with the sub-array; and
   reconstructing the diagonal parity storage device from all data storage devices of the array.

23. The method of claim 22 wherein the step of correcting storage device failures further comprises the step of, if the storage device failure is a double failure within the sub-array, recovering two failed storage devices within the sub-array using an EVENODD reconstruction process.

24. Apparatus for correcting double failures in a storage array using a combination of a single diagonal parity group and multiple row parity groups, the apparatus comprising:
   means for organizing the storage array as a plurality of concatenated sub-arrays based on double failure protection encoding, each sub-array including a set of data storage devices and a row parity storage device, the storage array further including a global diagonal parity storage device for holding diagonal parity;
   means for computing the diagonal parity for the single diagonal parity group across the concatenated sub-arrays; and
   means for correcting storage device failure within the array using the row parity storage device associated with each sub-array and the global diagonal parity storage device associated with the storage array.

25. A computer readable medium containing executable program instructions for correcting double failures in a storage array using a combination of a single diagonal parity group and multiple row parity groups, the executable program instructions comprising program instructions for:
   organizing the storage array as a plurality of concatenated sub-arrays based on double failure protection encoding, each sub-array including a set of data storage devices and a row parity storage device, the storage array further including a global diagonal parity storage device for holding diagonal parity;
   computing the diagonal parity for the single diagonal parity group across the concatenated sub-arrays;
   correcting storage device failure within the array using the row parity storage device associated with each sub-array and the global diagonal parity storage device associated with the storage array.

26. A system to correct multiple storage element failures in an array using a combination of multiple first failure recovery groups and a single secondary failure recovery group, the system comprising:
   a storage array having a plurality of concatenated sub-arrays, each sub-array including a set of data storage elements and a first failure recovery storage element storing first values used to correct a single failure within the sub-array, the array further including a global failure recovery storage element associated with the storage array and holding secondary values for the single secondary failure recovery group, the secondary values computed across the concatenation of the sub-arrays.

27. The system of claim 26 wherein the storage elements are packets and wherein the failure recovery is parity.

28. A method for operating a storage array, comprising:
   organizing the storage array as a plurality of concatenated sub-arrays based on double failure protection encoding, each sub-array including a set of data storage devices and a row parity storage device, the storage array further including a global diagonal parity storage device for holding diagonal parity;
   computing the diagonal parity for the single diagonal parity group across the concatenated sub-arrays;
   correcting storage device failure within the array using the row parity storage device associated with each sub-array and the global diagonal parity storage device associated with the storage array;
   determining whether the storage device failure is to a single storage device in a sub-array;
   if the storage device failure is to a single storage device in the sub-array, reconstructing the failed storage device using local row parity associated with the sub-array; and
   if the storage device failure is not to a single storage device in the sub-array, reconstructing the failed global diagonal parity storage device using all data storage devices of all sub-arrays of the array.

29. A storage array, comprising:
   means for organizing the storage array as a plurality of concatenated sub-arrays based on double failure protection encoding, each sub-array including a set of data storage devices and a row parity storage device, the storage array further including a global diagonal parity storage device for holding diagonal parity;
   means for computing the diagonal parity for the single diagonal parity group across the concatenated sub-arrays;
   means for correcting storage device failure within the array using the row parity storage device associated with each sub-array and the global diagonal parity storage device associated with the storage array;
   means for determining whether the storage device failure is to a single storage device in a sub-array;
   if the storage device failure is to a single storage device in the sub-array, means for reconstructing the failed storage device using local row parity associated with the sub-array; and
   if the storage device failure is not to a single storage device in the sub-array, means for reconstructing the failed global diagonal parity storage device using all data storage devices of all sub-arrays of the array.

30. A method for correcting double failures in a storage array, comprising:
organizing the storage array as a plurality of concatenated sub-arrays, each sub-array including a set of data storage devices and a row parity storage device, the storage array further including a global diagonal parity storage device for holding diagonal parity;
computing the diagonal parity across the concatenated sub-arrays; and
correcting storage device failure within the array using the row parity storage device associated with each sub-array and the global diagonal parity storage device.

31. The method of claim 30, further comprising:
storing all row parity data on a dedicated disk storage device.

32. The method of claim 30, further comprising:
storing all diagonal parity data on a dedicated disk storage device.

33. The method of claim 30, further comprising:
encoding the double failure protection as row-diagonal parity encoding.

34. The method of claim 30, further comprising:
encoding the double failure protection as EVENODD parity encoding.

35. The method of claim 30, further comprising:
determining whether the storage device failure is to a single storage device in one of the sub-arrays;
if the storage device failure is to a single storage device in one of the sub-arrays, reconstructing the failed storage device using local row parity associated with the sub-array; and
if the storage device failure is not to a single storage device in one of the sub-arrays, re-constructing the failed global diagonal parity storage device using all data and row parity storage devices of all sub-arrays of the array.

36. The method of claim 30, further comprising:
if the storage device failure is not a single storage device failure, determining whether the storage device failure is a double failure within one of the sub-arrays;
if the storage device failure is not a double failure within one of the sub-arrays, determining whether one of the failures includes the diagonal parity storage device; and
if one of the failures does not include the diagonal parity storage device, reconstructing the failed storage device in each sub-array using local row parity.

37. The method of claim 30, further comprising:
if one of the failures includes the diagonal parity storage device, determining whether another of the failed storage devices includes a row parity storage device;
if the another of the failed storage devices includes the row parity storage device, reconstructing the row parity storage device from the data storage devices of the sub-array; and
reconstructing the diagonal parity storage device from all data and row parity storage devices of all sub-arrays of the array.

38. The method of claim 30, further comprising:
if the another of the failed storage devices does not include the row parity storage device, reconstructing the data storage device using local row parity associated with the sub-array; and
reconstructing the diagonal parity storage device from all data and row parity storage devices of all sub-arrays of the array.

39. The method of claim 30, further comprising:
if the storage device failure is a double failure within one of the sub-arrays, recovering two failed storage devices within the sub-array using a row-diagonal reconstruction process.

40. The method of claim 30, further comprising:
using the diagonal parity storage device to recover at least one data block from a first of the failed storage devices of one of the sub-arrays; and
once the data block is recovered, using row parity within the same sub-array to recover a corresponding block in a second of the failed storage devices.

41. The method of claim 30, further comprising:
organizing each sub-array as a concentrated parity disk array.

42. The method of claim 30, further comprising:
organizing each sub-array as a distributed parity disk array.

43. A storage array, comprising:
means for organizing the storage array as a plurality of concatenated sub-arrays, each sub-array including a set of data storage devices and a row parity storage device, the storage array further including a global diagonal parity storage device for holding diagonal parity;
means for computing the diagonal parity across the concatenated sub-arrays; and
means for correcting storage device failure within the array using the row parity storage device associated with each sub-array and the global diagonal parity storage device.

44. The storage array of claim 43, further comprising:
means for storing all row parity data on a dedicated disk storage device.

45. The storage array of claim 43, further comprising:
means for storing all diagonal parity data on a dedicated disk storage device.

46. The storage array of claim 43, further comprising:
means for encoding the double failure protection as row-diagonal parity encoding.

47. The storage array of claim 43, further comprising:
means for encoding the double failure protection as EVENODD parity encoding.

48. The storage array of claim 43, further comprising:
means for determining whether the storage device failure is to a single storage device in one of the sub-arrays;
if the storage device failure is to a single storage device in one of the sub-arrays, means for reconstructing the failed storage device using local row parity associated with the sub-array; and
if the storage device failure is not to a single storage device in one of the sub-arrays, means for re-constructing the failed global diagonal parity storage device using all data and row parity storage devices of all sub-arrays of the array.

49. The storage array of claim 43, further comprising:
if the storage device failure is not a single storage device failure, means for determining whether the storage device failure is a double failure within one of the sub-arrays;
if the storage device failure is not a double failure within one of the sub-arrays, means for determining whether one of the failures includes the diagonal parity storage device; and
if one of the failures does not include the diagonal parity storage device, means for reconstructing the failed storage device in each sub-array using local row parity.

50. The storage array of claim 43, further comprising:
if one of the failures includes the diagonal parity storage device, means for determining whether another of the failed storage devices includes a row parity storage device;
if the another of the failed storage devices includes the row parity storage device, means for reconstructing the row parity storage device from the data storage devices of the sub-array; and
means for reconstructing the diagonal parity storage device from all data and row parity storage devices of all sub-arrays of the array.

51. The storage array of claim 43, further comprising:
if the another of the failed storage devices does not include the row parity storage device, means for reconstructing the data storage device using local row parity associated with the sub-array; and
means for reconstructing the diagonal parity storage device from all data and row parity storage devices of all sub-arrays of the array.

52. The storage array of claim 43, further comprising:
if the another of the failed storage devices does not include the row parity storage device, means for reconstructing the data storage device using local row parity associated with the sub-array; and
means for reconstructing the diagonal parity storage device from all data and row parity storage devices of all sub-arrays of the array.

53. The storage array of claim 43, further comprising:
means for using the diagonal parity storage device to recover at least one data block from a first of the failed storage devices of one of the sub-arrays; and
once the data block is recovered, means for using row parity within the same sub-array to recover a corresponding block in a second of the failed storage devices.

54. The storage array of claim 43, further comprising:
means for organizing each sub-array as a concentrated parity disk array.

55. The storage array of claim 43, further comprising:
means for organizing each sub-array as a distributed parity disk array.

56. A computer readable media, comprising:
said computer readable media containing instructions for execution on a processor for the practice of a method for correcting double failures in a storage array, having the steps,
organizing the storage array as a plurality of concatenated sub-arrays, each sub-array including a set of data storage devices and a row parity storage device, the storage array further including a global diagonal parity storage device for holding diagonal parity;
computing the diagonal parity across the concatenated sub-arrays; and
correcting storage device failure within the array using the row parity storage device associated with each sub-array and the global diagonal parity storage device.

57. A method of correcting failures in a storage array comprising:
organizing the storage array into a plurality of sub-arrays, each sub-array including a plurality of data storage devices and at least one row parity storage device for storing parity information for the data storage devices;
computing global diagonal parity information across the plurality of sub-arrays, the global diagonal parity information computed from both the data storage devices and the row parity storage devices in the plurality of sub-arrays.
storing the global diagonal parity information in a global diagonal parity storage device;
detecting a storage device failure;
if the storage device failure is a single failed data storage device in one of the sub-arrays, reconstructing the single failed data storage device using row parity from the row parity storage device of that one of the sub-arrays;
if the storage device failure is two failed storage devices within one of the sub-arrays, reconstructing the two failed storage data devices using a row-diagonal reconstruction process.

58. The method of claim 57 further comprising:
if the storage device failure is a failed row parity storage device in one of the sub-arrays, reconstructing the failed row parity storage device using the data storage devices in that one of the sub-arrays.

59. The method of claim 57 further comprising:
if the storage device failure is a failed global diagonal parity storage device, reconstructing the failed global parity storage device using all the data storage devices and the row parity storage devices of all the plurality of sub-arrays.

60. The method of claim 57 further comprising:
if the storage device failure is a failed row parity storage device in a one of the sub arrays and a failed global diagonal parity storage device, first reconstructing the failed row parity storage device using the data storage devices in that one of the sub-arrays, and then reconstructing the failed global parity storage device using all the data storage devices and all the row parity storage devices in all the plurality of sub-arrays.

61. The method of claim 57 further comprising:
if the storage device failure is the failure of two data storage devices that reside in different sub-arrays, reconstructing each failed data storage device using row parity information from the row parity storage device of the sub-array in which the failed data storage device resides.

62. An apparatus for correcting failures in a storage array comprising:
means for organizing the storage array into a plurality of sub-arrays, each sub-array including a plurality of data storage devices and at least one row parity storage device for storing parity information for the data storage devices;
means for computing global diagonal parity information across the plurality of sub-arrays, the global diagonal parity information computed from both the data storage devices and the row parity storage devices in the plurality of sub-arrays.
means storing the global diagonal parity information in a global diagonal parity storage device;
means for detecting a storage device failure;
if the storage device failure is a single failed data storage device in one of the sub-arrays, means for reconstructing the single failed data storage device using row parity from the row parity storage device of that one of the sub-arrays;
if the storage device failure is two failed storage devices within one of the sub-arrays, means for reconstructing the two failed storage data devices using a row-diagonal reconstruction process.

63. The apparatus of claim 62 further comprising:

if the storage device failure is a failed row parity storage device in one of the sub-arrays, means reconstructing the failed row parity storage device using the data storage devices in that one of the sub-arrays.

64. The apparatus of claim 62 further comprising:

if the storage device failure is a failed global diagonal parity storage device, means for reconstructing the failed global parity storage device using all the data storage devices and the row parity storage devices of all the plurality of sub-arrays.

65. The apparatus of claim 62 further comprising:

if the storage device failure is a failed row parity storage device in a one of the sub arrays and a failed global diagonal parity storage device, means for reconstructing the failed row parity storage device using the data storage devices in that one of the sub-arrays, and means for reconstructing the failed global parity storage device using all the data storage devices and all the row parity storage devices in all the plurality of sub-arrays.

66. The apparatus of claim 62 further comprising:

if the storage device failure is the failure of two data storage devices that reside in different sub-arrays, means for reconstructing each failed data storage device using row parity information from the row parity storage device of the sub-array in which the failed data storage device resides.

67. A computer readable medium containing executable program instructions for correcting failures in a storage array, the executable program instructions comprising program instructions for:

computing global diagonal parity information across the plurality of sub-arrays, the global diagonal parity information computed from both the data storage devices and the row parity storage devices in the plurality of sub-arrays.

storing the global diagonal parity information in a global diagonal parity storage device;

detecting a storage device failure;

if the storage device failure is a single failed data storage device in one of the sub-arrays, reconstructing the single failed data storage device using row parity from the row parity storage device of that one of the sub-arrays;

if the storage device failure is two failed storage devices within one of the sub-arrays, reconstructing the two failed storage data devices using a row-diagonal reconstruction process.

* * * * *